Patented May 8, 1945

2,375,353

UNITED STATES PATENT OFFICE 2,375,353

SELENIUM RECTIFIER

Torwald David Leornard Ekenäs and Gustaf Edvard Fåhraeus, Stockholm, Sweden, assignors to Bolidens Gruvaktiebolag, Stockholm, Sweden, a limited joint-stock company of Sweden No Drawing. Application December 4, 1943, Serial No. 512,975. In Sweden May 17, 1940

2 Claims. (Cl. 175—366)

The present invention relates to an electrode system having unsymmetrical electric conductivity and containing an electrode consisting mainly of selenium.

It has been known in manufacturing such rectifiers to introduce in the layer of selenium small quantities of free iodine that will cause an increase of the electric conductivity of the selenium. This addition, however, will also cause a great inconvenience as the checking resistance of the rectifier will be considerably reduced by the presence of iodine in the layer of selenium.

Now the inventors have found that the removal of the iodine on the surface of the selenium by suitable means will highly increase the checking resistance of the rectifier.

According to the invention the selenium plate, therefore, is subjected to a surface treatment by means of such inorganic fluids or solutions as will attack (dissolve) and remove the iodine from the selenium surface. This surface treatment, according to the present invention, is effected after a thin layer of iodine-containing selenium has been applied to a supporting electrode and the selenium if required has been transformed into the good conducting crystalline modification, but prior to the application of the counter-electrode.

Appropriate fluids for effecting such surface treatment are water, ether or alcohol. Still more suitable are such fluids or solutions as are also able to dissolve such impurities as have been present in the selenium from the beginning. Among these alkali should be named in the first place.

Having thus described our invention, we declare that what we claim is:

1. In the manufacture of selenium rectifiers, the steps comprising adding iodine to the selenium, then transforming the latter into the good conductive crystalline modification and, before applying the counter-electrode to the selenium in the form of a layer, treating the surface of the iodine-containing selenium layer by inorganic fluids or solutions which attack and remove the iodine present in the surface of the selenium.

2. A method as claimed in claim 1 wherein the iodine-containing selenium surface is treated with alkali.

TORWALD DAVID LEORNARD EKENÄS.
GUSTAF EDVARD FÅHRAEUS.